US008150266B1

(12) United States Patent
Drost

(10) Patent No.: US 8,150,266 B1
(45) Date of Patent: Apr. 3, 2012

(54) METHOD AND APPARATUS FOR PERFORMING BUTTERFLY DIFFERENTIAL SIGNALING

(75) Inventor: Robert J. Drost, Mountain View, CA (US)

(73) Assignee: Oracle America, Inc., Redwood Shores, CA (US)

( * ) Notice: Subject to any disclaimer, the term of this patent is extended or adjusted under 35 U.S.C. 154(b) by 2699 days.

(21) Appl. No.: 10/660,861

(22) Filed: Sep. 12, 2003

(51) Int. Cl.
*H04B 10/00* (2006.01)
*H04B 3/28* (2006.01)

(52) U.S. Cl. .............. 398/140; 333/4; 333/12

(58) Field of Classification Search .......... 333/1, 4, 333/5, 12, 136, 24 R; 439/607.05; 398/140
See application file for complete search history.

(56) References Cited

U.S. PATENT DOCUMENTS

| 5,966,056 A * | 10/1999 | Thornton ................ 333/5 |
| 6,809,609 B1 * | 10/2004 | Shibata et al. ............ 333/12 |
| 6,876,088 B2 * | 4/2005 | Harvey ................... 257/778 |
| 6,891,447 B2 * | 5/2005 | Song ..................... 333/24 R |
| 7,802,049 B2 * | 9/2010 | Levy .................... 710/316 |
| 2004/0166817 A1 * | 8/2004 | Mokhtari et al. ........... 455/91 |
| 2005/0135813 A1 * | 6/2005 | Cao ..................... 398/140 |

\* cited by examiner

*Primary Examiner* — Robert Pascal
*Assistant Examiner* — Alan Wong
(74) *Attorney, Agent, or Firm* — Park, Vaughan, Fleming & Dowler LLP

(57) ABSTRACT

One embodiment of the present invention provides a system that performs differential signaling through parallel ports in a manner that reduces noise caused by coupling between neighboring ports. The system includes parallel ports for transmitting differential signals from a sender to a receiver, wherein the parallel ports are organized in a two-dimensional grid. Each differential signal is transmitted through a first port and a second port that carry complementary positive and negative components of the differential signal. The first and second ports of a differential pair are diagonally adjacent to each other in the two-dimensional grid. Because the first and second ports transition in opposite directions, coupling noise is cancelled on a neighboring port that is horizontally adjacent to the first port and vertically adjacent to the second port. Moreover, a transition on the neighboring port couples equally to the first port and second port and is consequently rejected as common-mode noise by a corresponding differential receiver.

27 Claims, 5 Drawing Sheets

METHOD AND APPARATUS FOR PERFORMING BUTTERFLY DIFFERENTIAL SIGNALING

GOVERNMENT LICENSE RIGHTS

This invention was made with United States Government support under Contract No. NBCH020055 awarded by the Defense Advanced Research Projects Administration. The United States Government has certain rights in the invention.

BACKGROUND

1. Field of the Invention

The present invention relates to techniques for communicating signals between electrical circuits. More specifically, the present invention relates to a method and an apparatus for performing differential signaling through parallel communication channels in a manner that reduces coupling noise between nearby communication channels.

2. Related Art

As processor clock speeds continue to increase at an exponential rate, it is becoming increasingly harder to communicate signals between computer system components in a manner that meets bandwidth requirements. In order to achieve high bandwidth, systems typically route signals through a number of communication channels in parallel. (Note that these parallel communication channels typically use electrical, capacitive, inductive or optical signaling.) Many systems additionally use differential signaling techniques, in which complementary pairs of signals are communicated through parallel communication channels.

These parallel communication channels are typically packed into a small area to achieve high bandwidth within a small cross-sectional area. Unfortunately, packing channels together leads to "coupling" between neighboring communication channels. This coupling introduces noise, which reduces the signal-to-noise ratio in the communication channels and thereby adversely affects communication through the communication channels.

Existing systems solve this coupling problem in a number of ways. Physical separation can be introduced between communication channels. However, introducing physical separation can significantly increase the cross-sectional area used for communication. Grounding planes between can be inserted between electrical, capacitive or inductive communication channels. Such grounding planes protect the communication channels from noise. However, they also introduce parasitic capacitances that can retard and attenuate signals that pass through the communication channels.

Hence, what is needed is a method and an apparatus that facilitates differential signaling through parallel communication channels in a manner that reduces coupling noise between nearby communication channels.

SUMMARY

One embodiment of the present invention provides a system that performs differential signaling through parallel ports in a manner that reduces noise caused by coupling between neighboring ports. The system includes parallel ports for transmitting differential signals from a sender to a receiver, wherein the parallel ports are organized in a two-dimensional grid. Each differential signal is transmitted through a first port and a second port that carry complementary positive and negative components of the differential signal. The first and second ports of a differential pair are diagonally adjacent to each other in the two-dimensional grid. Because the first and second ports transition in opposite directions, coupling noise is cancelled on a neighboring port that is horizontally adjacent to the first port and vertically adjacent to the second port. Moreover, a transition on the neighboring port couples equally to the first port and second port and is consequently rejected as common-mode noise by a corresponding differential receiver.

In a variation on this embodiment, four differential pairs in the two-dimensional grid are arranged into a tiling pattern that can be replicated to cover the two-dimensional grid. This tiling pattern is arranged so that: a second component of a first pair is adjacent to the northeast of a first component of the first pair; a first component of a second pair is adjacent to the north of the first component of the first pair and is adjacent to the west of the second component of the first pair; a second component of the second pair is adjacent to the northwest of the first component of the second pair; a first component of a third pair is adjacent to the north of the first component of the second pair and is adjacent to the east of the second component of the second pair; a second component of the third pair is adjacent to the northeast of the first component of the third pair; a first component of a fourth pair is adjacent to the north of the second component of the first pair, is adjacent to the east of the first component of the third pair, and is adjacent to the south of the second component of the third pair; and a second component of the fourth pair is adjacent to the southeast of the first component of the fourth pair, and is adjacent to the east of the second component of the first pair.

In a variation on this embodiment, sender ports are located on or near the surface of a first semiconductor chip and receiver ports are located on or near the surface of a second semiconductor chip. Moreover, the first and second semiconductor chips are positioned face-to-face so that receiver ports overlap sender ports to facilitate communication between the first semiconductor chip and the second semiconductor chip.

In a variation on this embodiment, sender and receiver ports are capacitive plates positioned so that voltage changes on sender plates cause voltage changes on corresponding receiver plates through capacitive coupling.

In a variation on this embodiment, sender and receiver ports are conductive pads positioned to be in contact with each other directly (or through wires organized in the same two-dimensional grid), thereby creating a conductive path for current flow between sender ports and corresponding receiver ports.

In a variation on this embodiment, sender and receiver ports are wire loops positioned so that current flow in sender loops causes current to flow in corresponding receiver loops through inductive coupling.

In a variation on this embodiment, the sender ports are optical signal generators and the receiver ports are photodetectors. Furthermore, the sender ports and receiver ports are positioned so that optical signals can be transmitted from the sender ports to corresponding receiver ports.

In a variation on this embodiment, ports can have one of the following shapes: square; diamond; round; and oval.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Differential Signaling

Figure 1:
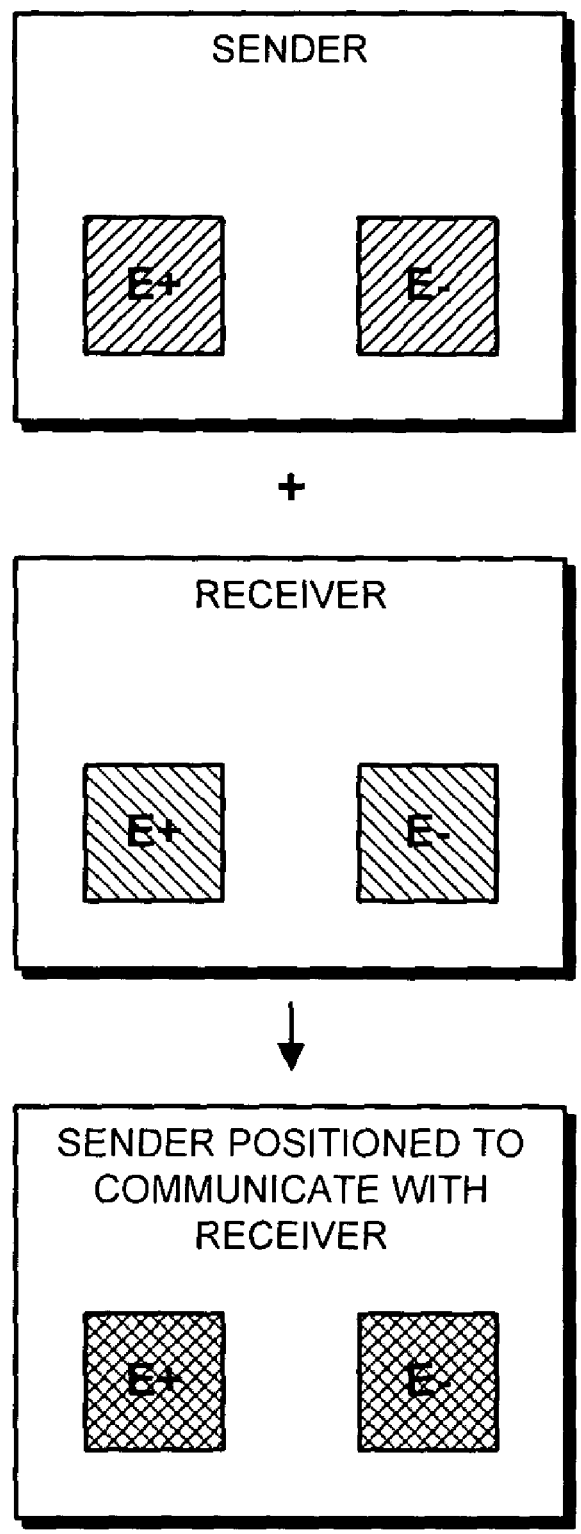
FIG. 1 illustrates sender and receiver ports.

FIG. 1 illustrates sender and receiver systems with communication ports organized in a planar arrangement. These sender and receiver systems use differential signaling to reduce noise generation and noise sensitivity problems that can potentially arise during signal transmissions. In order to communicate with each other, the sender and receiver systems are arranged so that a signal transmitted on a sender port causes a signal to be received on the corresponding receiver port.

Note that the coupling medium between sender and receiver ports can be conductive, capacitive, inductive, or optical. For instance, with conductive coupling, ports can be conductive metal pads. By placing a conductive sender pad in contact with a conductive receiver pad (or with a wire that contacts the conductive receiver pad), a low-resistance conductive path for current flow is created from the sender to the receiver. For inductive coupling, the ports can be loops, wherein a current flow through a sender loop causes a current to flow in a receiver loop through inductive coupling. For optical coupling, the sender port can be an optical generation element, such as a diode or laser, and the receiver port can be a photo-detector. For capacitive coupling, the sender and receiver ports can be capacitive plates, wherein signals on the sender plate can cause voltage changes on the receiver plate via capacitive coupling.

Referring to FIG. 1, when sender and receiver ports are positioned to communicate with each other, they are aligned so that the coupling mechanism can transfer signal energy from the sender port to the receiver port.

Figure 2:
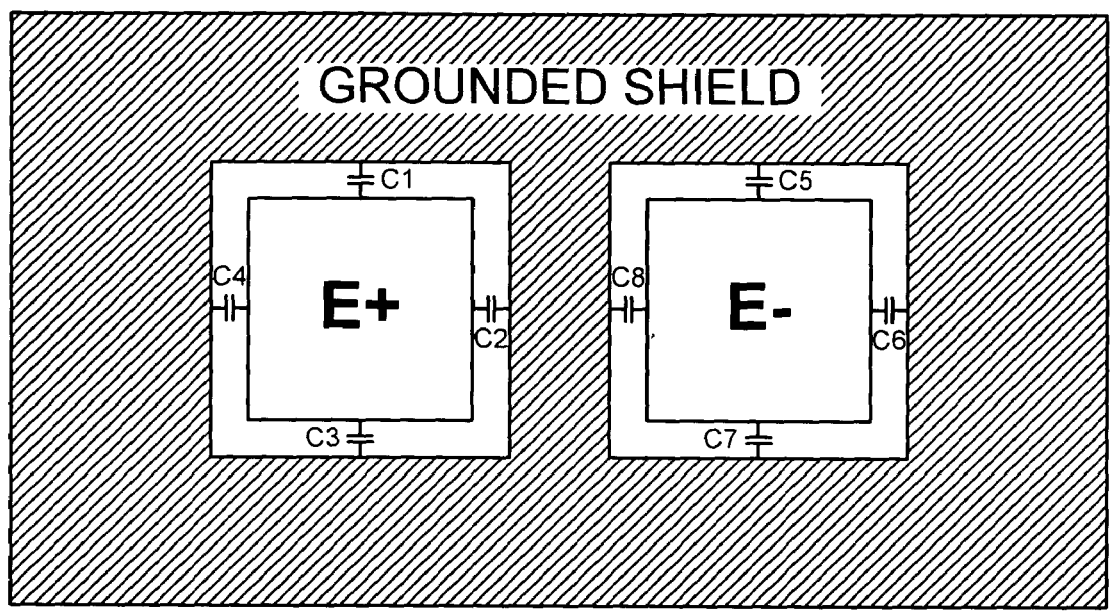
FIG. 2 illustrates a grounding shield.

Although FIG. 1 illustrates a communication channel in isolation, in an actual physical implementation the communication channel is typically surrounded by something. For example, FIG. 2 illustrates a noiseless surround, wherein the communication channel is surrounded by a grounded shield. This grounded shield works well for conductive, inductive, or capacitive coupling. For optical coupling, it is desirable for a surround to reflect optical energy. This causes the channel to carry all of the signal energy to the receiver.

The grounded shield illustrated in FIG. 2 protects the channel from noise, but also loads the communication channel with parasitic capacitances C1 to C8. Parasitic capacitances C1 to C8 are the edge capacitances from the channel to the surround. These parasitic capacitances can retard and attenuate signals as they propagate from the sender port to receiver port.

Figure 3:
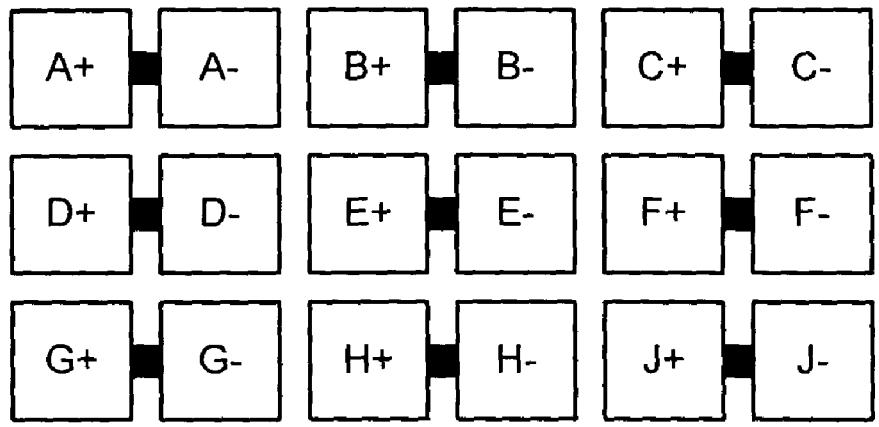
FIG. 3 illustrates an exemplary channel assignment for differential pairs in accordance with an embodiment of the present invention.

In order to communicate more information from the sender to receiver within a given cross-sectional area, a number of ports can be located close to each other. For example, FIG. 3 illustrates a simple channel assignment for ports that are located close to each other in accordance with an embodiment of the present invention. In FIG. 3, black bars are used to indicate differential pairs of ports. However, note that these black bars do not actually represent any physical structure; they simply assist in our visual inspection of the figure by highlighting pairs of ports that are differentially related.

Crosstalk between ports is a function of their adjacent edge length. Referring to FIG. 3, consider port E+ and E−. A differential signal on ports B+ and B− couples differentially to ports E+ and E− because B+ couples to E+ and B− couples to E−. Similarly for H+ and H−. Furthermore, ports D− and F+ couple in noise to E+ and E−. In a maximum coupling case B+, D−, and H+ all transition from low to high, while B−, H−, and F+ all transition from high to low. These coupled signals can subtract from the differential signal on E+ and E−; hence, these coupled signals are a noise source.

Note that E+ and E− couple to each other in a way that reduces the communicated signal because these two ports always transition in opposite directions.

Figure 4:
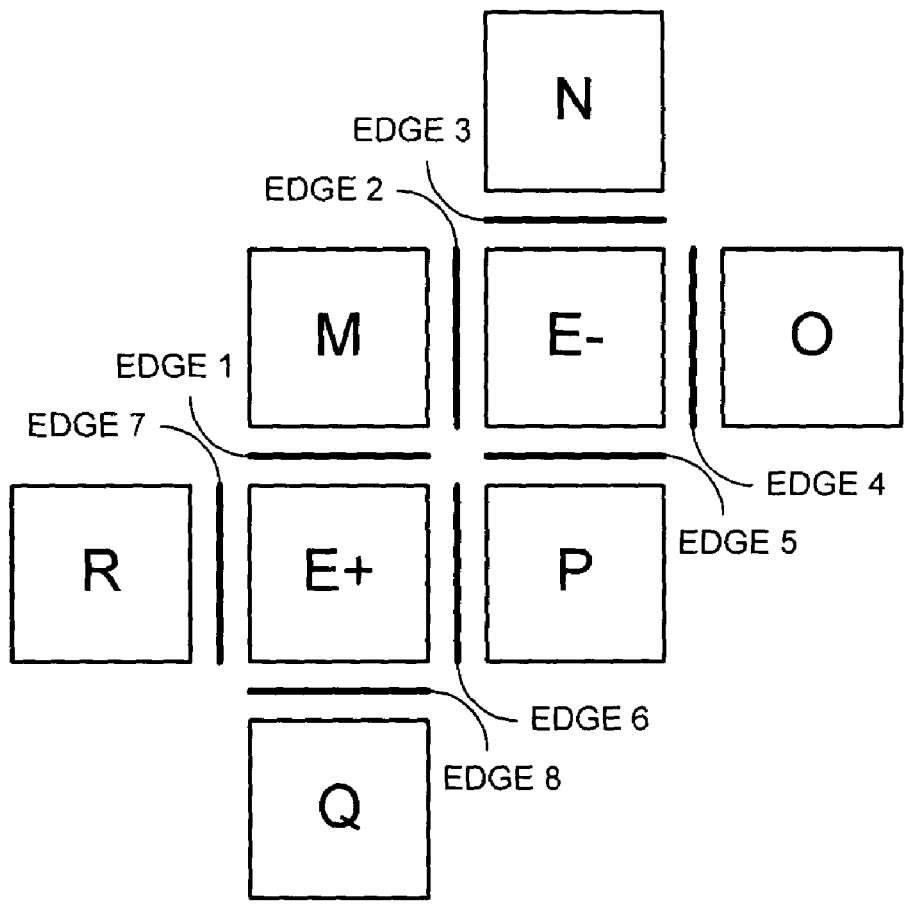
FIG. 4 illustrates another channel assignment for differential pairs in accordance with an embodiment of the present invention.

In order to reduce the coupling between the E+ and E− channels, we move them from being adjacent in horizontally to being adjacent diagonally, as illustrated in FIG. 4. This greatly reduces the coupling between the channels due to adjacent edge length.

Next, consider the ports surrounding E+ and E−. Port M has equal adjacent edge lengths to E+ and E−. As a result, a signal transition on port M will couple equally to ports E+ and E−, and a differential amplifier at the receiver will reject this common-mode noise. The same holds true for port P.

Moreover, ports N and O couple equally to port E−. If ports N and O are part of the same differential pair, they will transition in opposite directions. Hence, as a pair they will not couple any net noise into port E−. The same holds for true for ports R and Q in relation to port E−.

Figure 5:
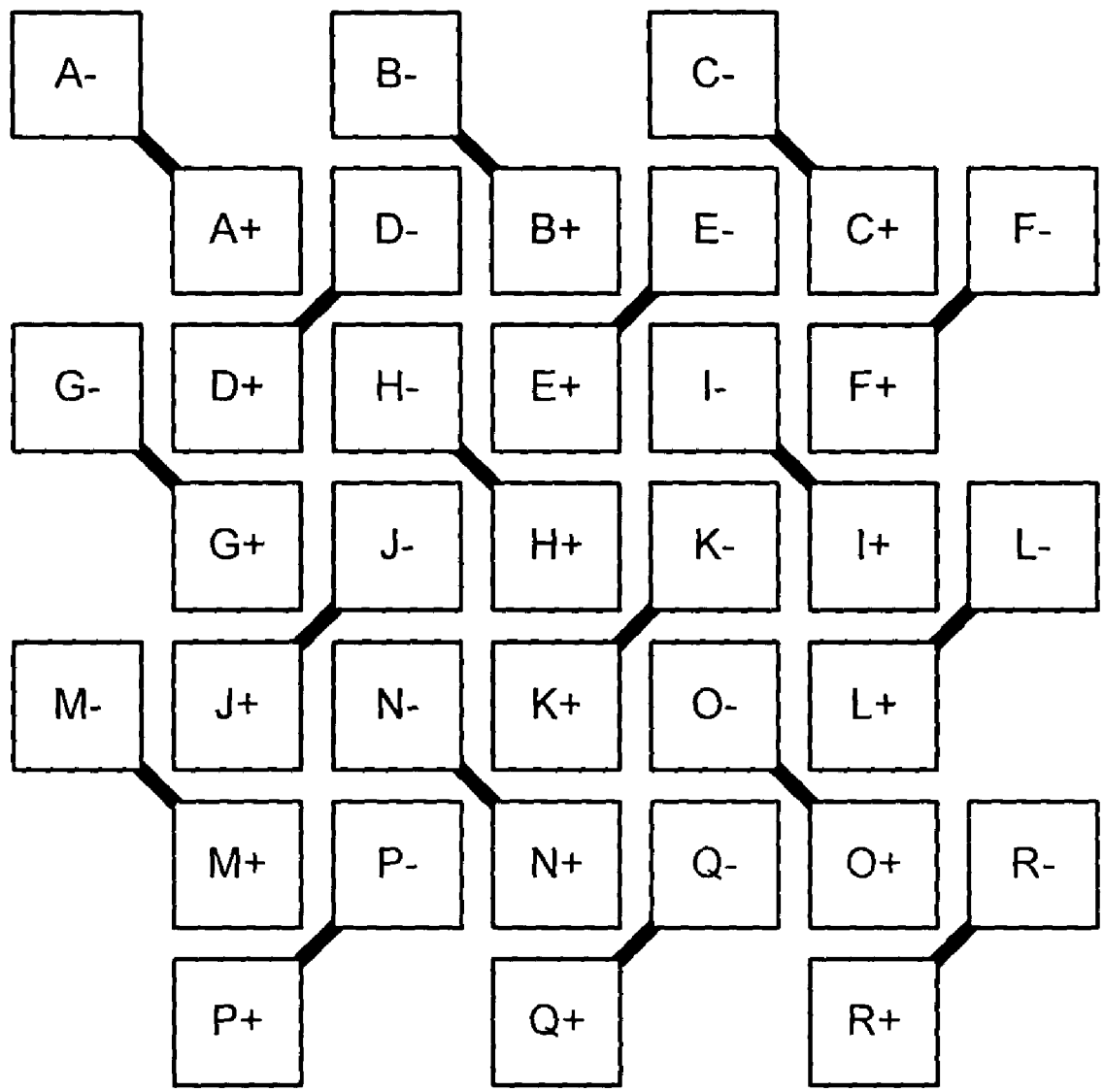
FIG. 5 illustrates how channels are assigned for a large number of differential pairs in accordance with an embodiment of the present invention.

FIG. 5 illustrates the butterfly channel assignment. Consider ports E+ and E−. Ports B+ and I− couple common-mode noise into E+ and E−. Ports C+, C−, H+ and H−, couple no net noise into E+ and E−. Hence, this arrangement produces no net differential coupling among ports. Therefore, when the sender and receiver ports are perfectly aligned, this channel assignment achieves a noise performance similar to the ground shield illustrated FIG. 2.

Similarly to FIG. 3, the black bars in FIG. 5 connect differential pairs of ports. These black bars do not represent any physical structure in the system; they simply assist in our visual inspection of the drawing by highlighting the pairs of ports that are differentially related.

Permutations

Figure 6:
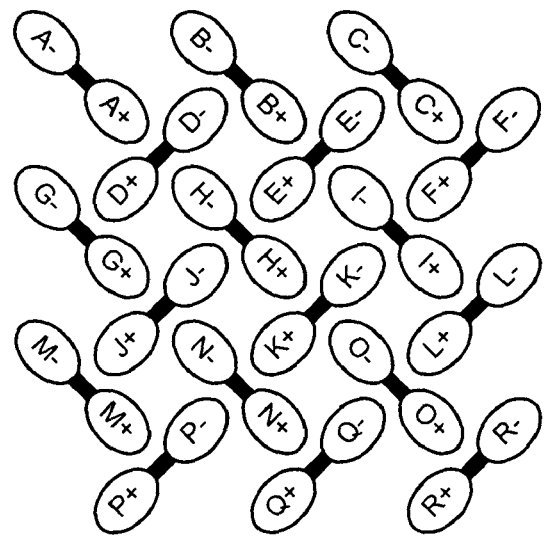
FIG. 6 illustrates a channel assignment with oval ports in accordance with an embodiment of the present invention.

Note that the ports can be a shape other than a square. For example, they can be diamonds, circles or ovals. To effect the cancellation in the coupling of transitions from other ports, it is desirable for the shape to be symmetric about the axis that connects the center of the differential pair of ports. FIG. 6 shows an example of a butterfly arrangement with oval shaped ports.

Figure 7:
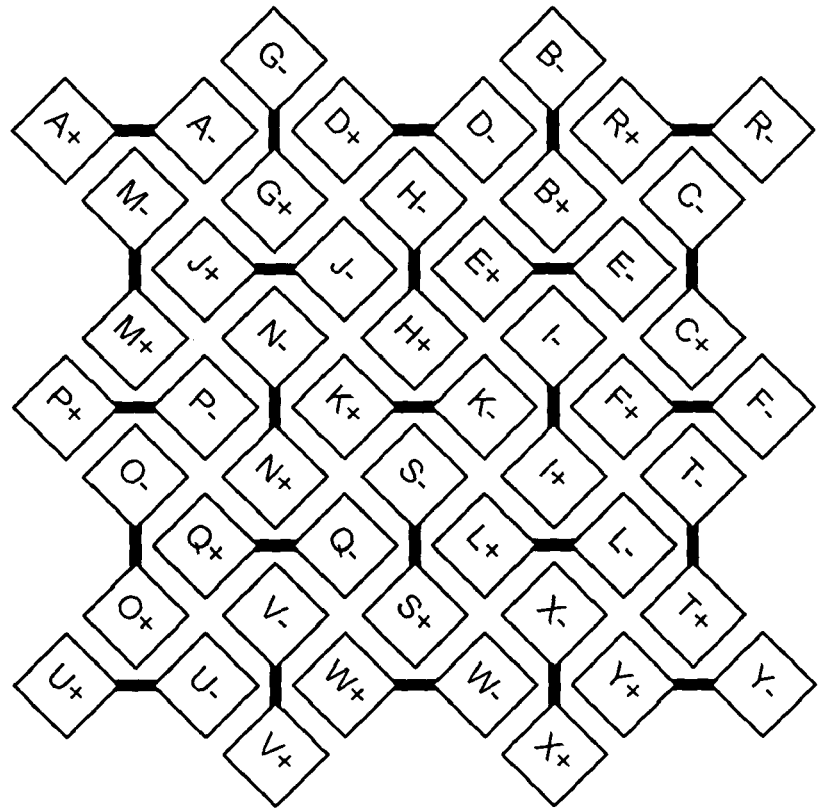
FIG. 7 illustrates a channel assignment with diamond ports in accordance with an embodiment of the present invention.

This butterfly arrangement does not require that the ports be on diagonals. For example, FIG. 7 shows an example of a butterfly channel assignment with the differential pairs of ports arranged vertically and horizontally. In this case, the ports themselves are diamonds rather than squares.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for performing differential signaling through parallel ports in a manner that reduces noise caused by coupling between neighboring ports, comprising:
    transmitting a number of differential signals from a sender to a receiver through parallel ports;
    wherein the parallel ports are organized in a two-dimensional grid;
    wherein each differential signal is transmitted through a first port and a second port that carry complementary positive and negative components of the differential signal;
    wherein the first and second ports of a differential pair are diagonally adjacent to each other in the two-dimensional grid;
    whereby because the first and second ports transition in opposite directions, coupling noise is cancelled on a neighboring port that is horizontally adjacent to the first port and vertically adjacent to the second port, and wherein a transition on the neighboring port couples equally to the first and second ports and is consequently rejected as common-mode noise by a corresponding differential receiver,
    wherein four differential pairs in the two-dimensional grid are arranged into a tiling pattern that can be replicated to cover the two-dimensional grid, wherein:
        a second component of a first pair is adjacent to the northeast of a first component of the first pair,
        a first component of a second pair is adjacent to the north of the first component of the first pair and is adjacent to the west of the second component of the first pair,
        a second component of the second pair is adjacent to the northwest of the first component of the second pair;
        a first component of a third pair is adjacent to the north of the first component of the second pair and is adjacent to the east of the second component of the second pair; and
        a second component of the third pair is adjacent to the northeast of the first component of the third pair.

2. The method of claim 1, wherein:
    a first component of the fourth pair is adjacent to the southeast of the first component of the fourth pair, and is adjacent to the east of the second component of the first pair; and
    a second component of a fourth pair is adjacent to the north of the second component of the first pair, is adjacent to the east of the first component of the third pair, and is adjacent to the south of the second component of the third pair.

3. The method of claim 1,
    wherein sender ports are located on or near the surface of a first semiconductor chip;
    wherein receiver ports are located on or near the surface of a second semiconductor chip; and
    wherein the first and second semiconductor chips are positioned face-to-face so that receiver ports overlap sender ports to facilitate communication between the first semiconductor chip and the second semiconductor chip.

4. The method of claim 1, wherein sender and receiver ports are capacitive plates positioned so that voltage changes on sender plates cause voltage changes on corresponding receiver plates through capacitive coupling.

5. The method of claim 1, wherein sender and receiver ports are conductive pads positioned to be in contact with each other, thereby creating a conductive path for current flow between sender ports and corresponding receiver ports.

6. The method of claim 5, wherein the conductive pads are coupled together through wires which create conductive paths between sender ports and corresponding receiver ports.

7. The method of claim 1, wherein sender and receiver ports are wire loops positioned so that current flow in sender loops causes current to flow in corresponding receiver loops through inductive coupling.

8. The method of claim 1,
    wherein the sender ports are optical signal generators;
    wherein the receiver ports are photo-detectors; and
    wherein the sender ports and receiver ports are positioned so that optical signals can be transmitted from sender ports to corresponding receiver ports.

9. The method of claim 1, wherein ports can have one of the following shapes:
    square;
    diamond;
    round; and
    oval.

10. An apparatus for performing differential signaling through parallel ports in a manner that reduces noise caused by coupling between neighboring ports, comprising:
    a set of parallel ports for transmitting differential signals from a sender to a receiver;
    wherein the set of parallel ports is organized in a two-dimensional grid;
    wherein each differential signal is transmitted through a first port and a second port that carry complementary positive and negative components of the differential signal;
    wherein the first and second ports of a differential pair are diagonally adjacent to each other in the two-dimensional grid;
    whereby because the first and second ports transition in opposite directions, coupling noise is cancelled on a neighboring port that is horizontally adjacent to the first port and vertically adjacent to the second port, and wherein a transition on the neighboring port couples equally to the first and second ports and is consequently rejected as common-mode noise by a corresponding differential receiver,
    wherein four differential pairs in the two-dimensional grid are arranged into a tiling pattern that can be replicated to cover the two-dimensional grid, wherein:
        a second component of a first pair is adjacent to the northeast of a first component of the first pair;
        a first component of a second pair is adjacent to the north of the first component of the first pair and is adjacent to the west of the second component of the first pair;
        a second component of the second pair is adjacent to the northwest of the first component of the second pair;
        a first component of a third pair is adjacent to the north of the first component of the second pair and is adjacent to the east of the second component of the second pair; and
        a second component of the third pair is adjacent to the northeast of the first component of the third pair.

11. The apparatus of claim 10, wherein:
    a first component of the fourth pair is adjacent to the southeast of the first component of the fourth pair, and is adjacent to the east of the second component of the first pair; and
    a second component of a fourth pair is adjacent to the north of the second component of the first pair, is adjacent to the east of the first component of the third pair, and is adjacent to the south of the second component of the third pair.

12. The apparatus of claim 10,
wherein sender ports are located on or near the surface of a first semiconductor chip;
wherein receiver ports are located on or near the surface of a second semiconductor chip; and
wherein the first and second semiconductor chips are positioned face-to-face so that receiver ports overlap sender ports to facilitate communication between the first semiconductor chip and the second semiconductor chip.

13. The apparatus of claim 10, wherein sender and receiver ports are capacitive plates positioned so that voltage changes on sender plates cause voltage changes on corresponding receiver plates through capacitive coupling.

14. The apparatus of claim 10, wherein sender and receiver ports are conductive pads positioned to be in contact with each other, thereby creating a conductive path for current flow between sender ports and corresponding receiver ports.

15. The apparatus of claim 14, wherein the conductive pads are coupled together through wires which create conductive paths between sender ports and corresponding receiver ports.

16. The apparatus of claim 10, wherein sender and receiver ports are wire loops positioned so that current flow in sender loops causes current to flow in corresponding receiver loops through inductive coupling.

17. The apparatus of claim 10,
wherein the sender ports are optical signal generators;
wherein the receiver ports are photo-detectors; and
wherein the sender ports and receiver ports are positioned so that optical signals can be transmitted from sender ports to corresponding receiver ports.

18. The apparatus of claim 10, wherein ports can have one of the following shapes:
square;
diamond;
round; and
oval.

19. An computer system that performs differential signaling through parallel ports in a manner that reduces noise caused by coupling between neighboring ports, comprising:
a processor;
a memory;
a set of parallel ports within the processor and/or the memory for transmitting differential signals from a sender to a receiver;
wherein the set of parallel ports is organized in a two-dimensional grid;
wherein each differential signal is transmitted through a first port and a second port that carry complementary positive and negative components of the differential signal;
wherein the first and second ports of a differential pair are diagonally adjacent to each other in the two-dimensional grid;
whereby because the first and second ports transition in opposite directions, coupling noise is cancelled on a neighboring port that is horizontally adjacent to the first port and vertically adjacent to the second port, and wherein a transition on the neighboring port couples equally to the first and second ports and is consequently rejected as common-mode noise by a corresponding differential receiver, wherein four differential pairs in the two-dimensional grid are arranged into a tiling pattern that can be replicated to cover the two-dimensional grid, wherein:
a second component of a first pair is adjacent to the northeast of a first component of the first pair;
a first component of a second pair is adjacent to the north of the first component of the first pair and is adjacent to the west of the second component of the first pair;
a second component of the second pair is adjacent to the northwest of the first component of the second pair;
a first component of a third pair is adjacent to the north of the first component of the second pair and is adjacent to the east of the second component of the second pair; and
a second component of the third pair is adjacent to the northeast of the first component of the third pair.

20. The computer system of claim 19, wherein:
a first component of the fourth pair is adjacent to the southeast of the first component of the fourth pair, and is adjacent to the east of the second component of the first pair; and
a second component of a fourth pair is adjacent to the north of the second component of the first pair, is adjacent to the east of the first component of the third pair, and is adjacent to the south of the second component of the third pair.

21. The computer system of claim 19,
wherein sender ports are located on or near the surface of a first semiconductor chip;
wherein receiver ports are located on or near the surface of a second semiconductor chip; and
wherein the first and second semiconductor chips are positioned face-to-face so that receiver ports overlap sender ports to facilitate communication between the first semiconductor chip and the second semiconductor chip.

22. The computer system of claim 19, wherein sender and receiver ports are capacitive plates positioned so that voltage changes on sender plates cause voltage changes on corresponding receiver plates through capacitive coupling.

23. The computer system of claim 19, wherein sender and receiver ports are conductive pads positioned to be in contact with each other, thereby creating a conductive path for current flow between sender ports and corresponding receiver ports.

24. The computer system of claim 23, wherein the conductive pads are coupled together through wires which create conductive paths between sender ports and corresponding receiver ports.

25. The computer system of claim 19, wherein sender and receiver ports are wire loops positioned so that current flow in sender loops causes current to flow in corresponding receiver loops through inductive coupling.

26. The computer system of claim 19,
wherein the sender ports are optical signal generators;
wherein the receiver ports are photo-detectors; and
wherein the sender ports and receiver ports are positioned so that optical signals can be transmitted from sender ports to corresponding receiver ports.

27. The computer system of claim 19, wherein ports can have one of the following shapes:
square;
diamond;
round; and
oval.

* * * * *